6/12/84 OR 4,453,409

United States Patent [19]

[11] 4,453,409
[45] Jun. 12, 1984

Naumann, Jr. et al.

[54] ULTRASONIC SECTOR SCANNER UTILIZING ROTATING TRANSDUCER

[75] Inventors: Ted F. Naumann, Jr., Shingle Springs; Ronald C. Carnes, Folsom, both of Calif.

[73] Assignee: General Electric Company, Rancho Cordova, Calif.

[21] Appl. No.: 290,838

[22] Filed: Aug. 7, 1981

[51] Int. Cl.$^3$ .............................................. G01N 29/04
[52] U.S. Cl. ........................................................ 73/639
[58] Field of Search .................. 73/625, 641, 639, 628

[56] References Cited

U.S. PATENT DOCUMENTS

| | | | |
|---|---|---|---|
| 3,817,089 | 6/1974 | Eggleton et al. | 73/625 X |
| 4,102,204 | 7/1978 | Kretz | 73/639 X |
| 4,143,554 | 3/1979 | Nagy et al. | 73/641 |
| 4,149,419 | 4/1979 | Connell, Jr. et al. | 73/639 |
| 4,185,501 | 1/1980 | Proudian et al. | 73/641 |
| 4,228,687 | 10/1980 | Fraser | 73/641 X |
| 4,232,556 | 11/1980 | Cole | 73/628 X |
| 4,289,025 | 9/1981 | Norel et al. | 73/639 X |

*Primary Examiner*—Anthony V. Ciarlante
*Attorney, Agent, or Firm*—Flehr, Hohbach, Test, Albritton & Herbert

[57] ABSTRACT

An ultrasonic sector scanner which utilizes rotating transducers uses an optical encoder for generating indexing signals. A slip-ring and brush assembly interconnects the transducers and electronic circuitry within the scanner.

3 Claims, 4 Drawing Figures

ULTRASONIC SECTOR SCANNER UTILIZING ROTATING TRANSDUCER

This invention relates generally to ultrasonic scanners such as used for medical diagnostic purposes, and more particularly the invention relates to an ultrasonic sector scanner in which a plurality of rotating transducers are selectively energized for scanning.

Ultrasonic diagnostic systems are known and commercially available for diagnostic purposes. See for example U.S. Pat. No. 4,172,386 for "Video A Trace Display System for Ultrasonic Diagnostic System" and U.S. Pat. No. 4,204,433 for "Computerized Ultrasonic Scanner With Technique Select". The commercially available Datason ultrasound system of General Electric Company provides both real time and static images on a television display.

Briefly, such systems utilize sound transducers to transmit ultrasonic (e.g. on the order of several megahertz) waves into a patient and to receive echo signals. In one mode of operation, the transducer is attached to a plurality of hinged arms for movement in a single plane, and potentiometers associated with the hinged arms produce signals which identify the transducer position. Alternatively, a transducer array or a hand held transducer can be used. The echo signals are applied to a time gain compensated amplifier to adjust the echo signals for attenuation in passing through the patient. The adjusted signals are then passed through an analog to digital conversion and video processing circuitry and thence to scan converter circuitry for display formatting. The display comprises a plurality of pixels in horizontal rows and vertical columns with each pixel having a brightness level in response to the input signal. Conventionally, the brightness is defined by a 32 level Gray-scale, hence the pixel brightness level requires a five bit digital code.

The hand-held unit or sector scanner can utilize a phased transducer array, an oscillating transducer, or a rotating transducer array. The phased array offers a high sample rate but is more expensive that the comparable designs. The oscillating transducer is a simple design and relatively compact. However, the oscillating transducer has a variable speed, thus uneven line spacing and typically a small sector angle. The rotating transducer array offers uniform transducer speed and a wider sector angle than does the oscillating transducer. However, the transducers must be accurately activated in time sequence. Heretofore, the position and orientation requirements have necessitated tightly controlled piece part tolerances and assembly tooling. This has resulted in expensive parts, high rejection rates, and restricted serviceability.

Accordingly, an object of the present invention is an improved sector scanner utilizing rotating transducers.

Another object of the invention is a sector scanner utilizing rotating transducers which are reliably coupled to electronic circuitry of the scanner.

Still another object of the invention is timing means integral with the rotating transducers for accurately controlling each transducer in proper sequence.

Yet another object of the invention is a sector scanner which is lower in cost and has increased serviceability.

A feature of the invention is a slip ring and brush assembly for electrically coupling the rotating transducers to electronic circuitry.

Another feature of the invention is optical indexing means integral with the slip ring assembly for providing a timing index for the sector scanner.

Briefly, an ultrasonic sector scanner in accordance with the invention includes a housing, a shaft rotatably mounted in the housing, and a motor mounted within the housing and coupled to rotate the shaft. A transducer support wheel is coupled to the shaft for rotating a plurality of transducers, and electronic circuitry is mounted within the housing for controlling the transducers in processing electrical signals therefrom. Means is provided for electrically connecting the electronic circuitry and the transducer means including a plurality of slip-rings positioned on the shaft and a plurality of brushes which engage the plurality of slip-rings. First conductive means electrically interconnect the brushes and the electronic circuitry, and second conductive means interconnects the slip-rings and transducers.

More particularly, the brushes are mounted to and comprise a part of a support block which is mounted within the housing in association with the slip rings. In accordance with another feature of the invention an optical emitter and an optical detector are mounted in spaced alignment in the brush support block. A disc having a notch in a peripheral portion is mounted on the shaft with the disc passing between the optical emitter and the optical detector whereby a signal is generated by the optical detector in response to light passage through the notch. Thus, a timing index signal properly coordinated with the position of the rotating transducers is generated and provided to the electronic control circuitry.

The invention and objects and features thereof will be more readily apparent from the following detailed description and appended claims when taken with the drawing, in which:

Figure 1:
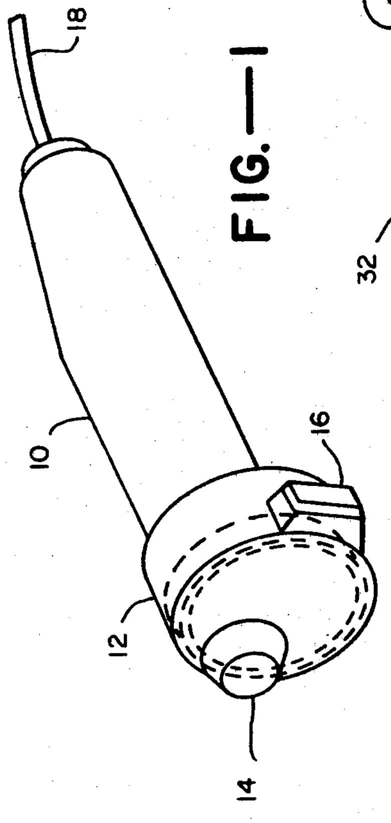
FIG. 1 is a perspective view of an ultrasonic sector scanner.

Referring to the drawings, FIG. 1 is a perspective view of an ultrasonic sector scanner which includes a housing 10 of suitable configuration for manual support by an operator. Housing 10 is enlarged at the end portion 12 to accommodate a rotating transducer assembly as will be described further hereinbelow. Ports 14 and 16 provide for the transmission of ultrasonic energy from the transducers within the housing portion 12 and a patient undergoing examination. Signals received by the transducers are passed through internal electronics within housing 10 and through cable 18 to external computer means (not shown) for processing and display.

Figure 2:
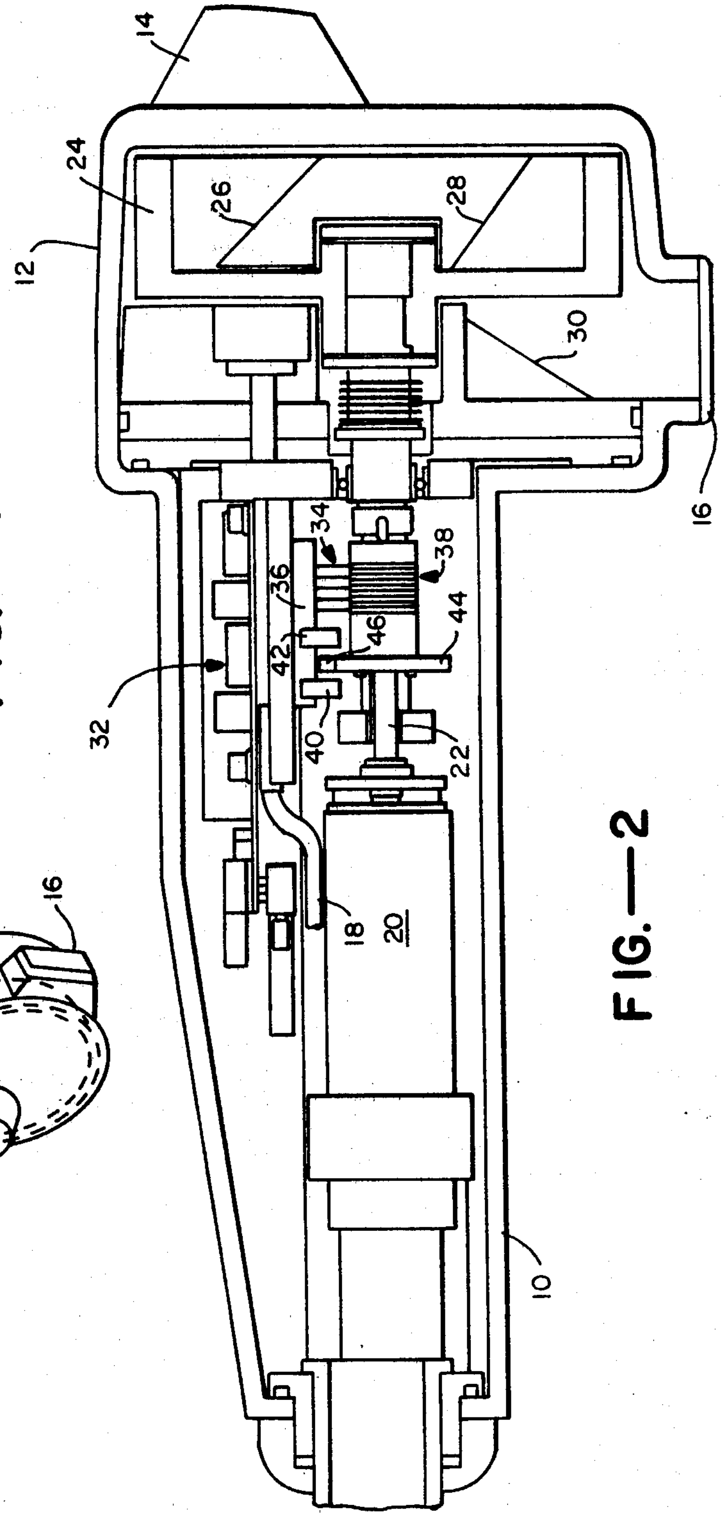
FIG. 2 is a second view of the sector scanner of FIG. 1 in accordance with one embodiment of the present invention.

FIG. 2 is a section view of the sector scanner of FIG. 1 with features in accordance with the present invention. Mounted within housing 10 is an electric motor 20 which rotates a hollow shaft 22. Rotatably mounted on shaft 22 within the housing portion 12 is a transducer assembly shown generally at 24. The transducer assembly includes a plurality of transducers (e.g. four) which are selectively actuated to transmit ultrasound energy through the ports 14 and 16 through use of the acoustic mirrors 26, 28, and 30. Use of such acoustic mirrors is well known in the art and does not comprise part of the present invention. The transducer assembly is further described in copending application Ser. No. 290,830 filed Aug. 7, 1981, now U.S. Pat. No. 4,402,223 for Ultrasonic Sector Scanner Utilizing Rotating Transducers.

Connected to the cable 18 is an electronic assembly 32 for controlling the transducer array and for processing electrical signals from the transducer array. In accordance with a feature of the present invention the electronic circuitry shown generally at 32 is electrically interconnected with the transducer array through means of a plurality of brushes shown generally at 34 which are mounted in a brush block assembly 36 and which electrically and physically engage slip-rings 38 mounted on the rotating shaft 22. Conductive cable within the shaft 22 electrically interconnects the slip-rings 38 and the transducers, and conductive means interconnects the brushes 34 and the circuitry 32.

An indexing signal for identifying the position of the transducer assembly 24 is provided to the electronic control circuitry 32 by electro-optical means including an optical transmitter 40 such as light emitting diode and an optical detector 42 which are mounted in spaced alignment in the brush block assembly 36. Mounted on shaft 22 is an indexing disc 44 the periphery of which passes between the electro-optical transmitter 40 and detector 42. A notch 46 is provided in a peripheral portion of the disc 44 whereby the transmission of light through the notch from transmitter 40 to detector 42 causes detector 42 to generate an electrical index signal that is transmitted to the circuitry 32. Thus, by physically positioning the disc 44 and notch 46 on shaft 22 in proper alignment with the transducer assembly 24, the indexing signal from optical detector 42 provides a necessary timing reference for the control circuitry 32.

Figure 3:
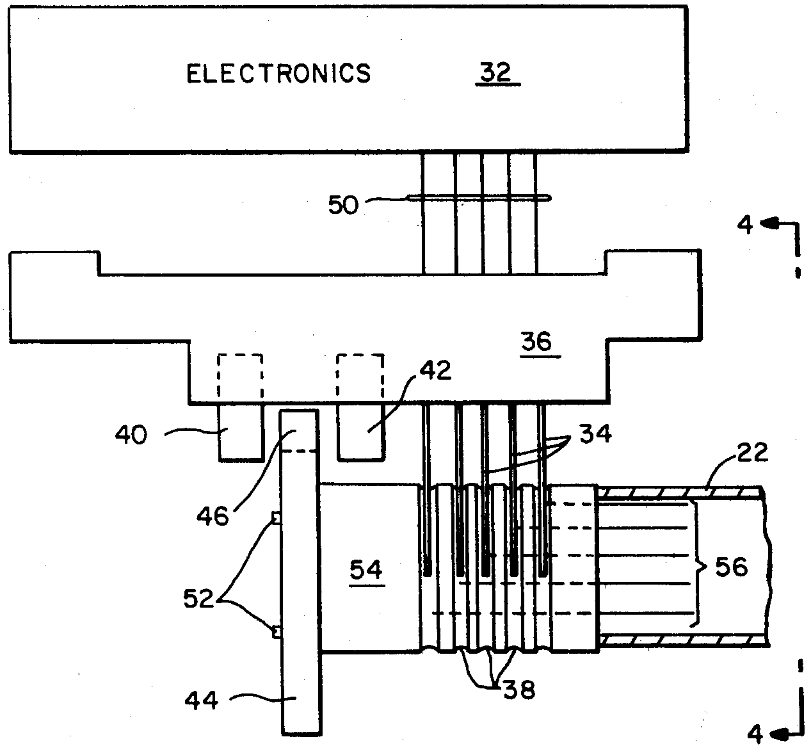
FIG. 3 is a plan view of a slip-ring and brush assembly and optical indexing means in accordance with one embodiment of the invention.
Figure 4:
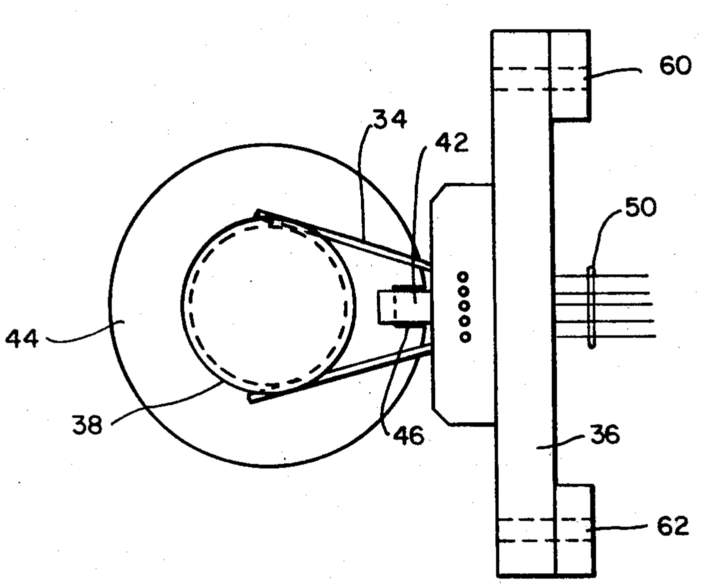
FIG. 4 is a side view of the slip-ring brush assembly of FIG. 3 taken along the line 4—4.

FIGS. 3 and 4 are more detailed drawings of the brush support block 36 and slip-rings of the embodiment of FIG. 2. The electronic circuitry 32 is interconnected by the conductors 50 the brushes 34 which are suitably mounted such as by molding in the support block 36. The indexing disc 44 is integral with bushing 54 about which the slip-rings 38 are mounted. Electrical conductors 56 are positioned within the hollow shaft 22 and electrically connect the slip-rings 38 and the transducer assembly.

As shown in the side view of FIG. 4, each brush 38 is preferably U shaped with both legs of the brush engaging a slip-ring 38 on opposing sides. The brush support block 36 may be mounted to the underside of a printed circuit board for the electronics 32 by fastener means extending through the holes 60 and 62.

The brush block assembly, slip-rings, and the indexing means are relatively simple in design, and the parts are readily assembled and calibrated with respect to the transducer assembly. Thus, the ultrasonic sector scanner embodying the invention is less expensive and readily serviceable.

While the invention has been described with reference to a specific embodiment, the description is illustrative of the inventiion and is not to be construed as limiting the invention. Various modifications and applications may occur to those skilled in the art without departing from the true spirit and scope of the invention as defined by the appended claims.

What is claimed is:

1. A hand-held ultrasonic sector scanner comprising a housing having a handle portion and a separated end portion, a hollow shaft rotatably mounted in said handle portion and said end portion of said housing, a motor mounted within said handle portion of said housing axially aligned with said shaft and coupled to rotate said shaft, a transducer support wheel in said end portion and including a plurality of transducers, said wheel being axially aligned with and coupled to said shaft for rotating said plurality of transducers, electronic circuitry mounted within said handle portion of said housing for controlling said transducers and processing electrical signals therefrom, means for electrically conducting said electronic circuitry and said transducers including a bushing mounted on said shaft within said handle portion and a plurality of slip-rings on said bushing and spaced along said shaft and a plurality of brushes engaging said plurality of slip-rings, each slip-ring being continuous, first conductive means electrically interconnecting said brushes and said electronic circuitry and second conductive means extending through said hollow shaft and electrically interconnecting said slip-rings and said transducers, a brush support block mounted to said housing in association with said slip-rings, and optical indexing means within said handle portion and including an optical emitter and an optical detector mounted in spaced alignment in said brush support assembly, a disc integral with said bushing mounted on said shaft, said disc having a notch in a peripheral portion, said disc passing between said optical emitter and said optical detector whereby an index signal is generated by said optical detector in response to light passing through said notch.

2. In a hand-held ultrasonic sector scanner including a housing having a handle portion and a scanner portion, a rotatable shaft in said housing, a plurality of transducers mounted on said shaft in said scanner portion, and electronic circuitry mounted within said handle portion of said housing, conductive means for electrically connecting said transducers with said electronic circuitry comprising a bushing with a plurality of slip-rings mounted on said shaft in said handle portion, each slip-ring being continuous, a brush support block including a plurality of brushes mounted in said handle portion of said housing with said plurality of brushes engaging said plurality of slip-rings, first conductive means electrically interconnecting said brushes and the electronic circuitry, second conductive means electrically interconnecting said slip-rings and said transducers, and an optical emitter and an optical detector mounted in spaced alignment in said brush support block, a disc integral with said bushing mounted on said shaft, said disc having a; notch in a peripheral portion, said disc passing between said emitter and said optical detector whereby an index signal is generated by said optical detector in response to light passing through said notch.

3. Conductive means as defined by claim 2 wherein the shaft is hollow and said second conductive means extends through said shaft.

* * * * *

UNITED STATES PATENT AND TRADEMARK OFFICE
CERTIFICATE OF CORRECTION

PATENT NO. : 4,453,409

DATED : June 12, 1984

INVENTOR(S) : Ted F. Naumann, Jr. and Ronald C. Carnes

It is certified that error appears in the above—identified patent and that said Letters Patent is hereby corrected as shown below:

Col. 1, line 43 delete "that" and substitute therefor --than--;

Col. 3, line 41 after "50" insert --to--;

Col. 4, line 17 delete "conducting" and substitute therefor --connecting--; and

Col. 4, line 59 delete "a;" and subtitute therefor --a--.

Signed and Sealed this

*Sixth* Day of *November 1984*

[SEAL]

*Attest:*

GERALD J. MOSSINGHOFF

*Attesting Officer*

*Commissioner of Patents and Trademarks*